United States Patent
Samper et al.

(10) Patent No.: US 10,852,725 B2
(45) Date of Patent: Dec. 1, 2020

(54) ACTIVATE/DEACTIVATE FUNCTIONALITY IN RESPONSE TO ENVIRONMENTAL CONDITIONS

(71) Applicant: Faraday & Future Inc., Gardena, CA (US)

(72) Inventors: Juan Pablo Samper, Mountain View, CA (US); Serge Nikulin, San Jose, CA (US); Xiufeng Song, San Jose, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/638,228

(22) Filed: Jun. 29, 2017

(65) Prior Publication Data

US 2018/0143628 A1 May 24, 2018

Related U.S. Application Data

(60) Provisional application No. 62/356,458, filed on Jun. 29, 2016.

(51) Int. Cl.
| | |
|---|---|
| *G05D 1/00* | (2006.01) |
| *B60W 50/14* | (2020.01) |
| *B60W 30/18* | (2012.01) |
| *B60W 50/12* | (2012.01) |
| *G08B 7/06* | (2006.01) |
| *B60W 40/08* | (2012.01) |

(52) U.S. Cl.
CPC ..... *G05D 1/0061* (2013.01); *B60W 30/18027* (2013.01); *B60W 50/12* (2013.01); *B60W 50/14* (2013.01); *B60K 2370/172* (2019.05); *B60K 2370/175* (2019.05); *B60K 2370/56* (2019.05); *B60W 2040/0818* (2013.01); *B60W 2420/42* (2013.01); *B60W 2420/52* (2013.01); *B60W 2540/22* (2013.01); *B60W 2554/00* (2020.02); *B60W 2554/80* (2020.02); *B60W 2555/60* (2020.02); *G08B 7/06* (2013.01)

(58) Field of Classification Search
None
See application file for complete search history.

(56) References Cited

U.S. PATENT DOCUMENTS

| | | | | |
|---|---|---|---|---|
| 9,493,118 | B1 * | 11/2016 | Laur | B60Q 9/008 |
| 2002/0116106 | A1 * | 8/2002 | Breed | B60Q 1/143 |
| | | | | 701/45 |

(Continued)

*Primary Examiner* — Nicholas K Wiltey
(74) *Attorney, Agent, or Firm* — Veros Legal Solutions, LLP

(57) ABSTRACT

Methods, systems, computer-readable media, and apparatuses for executing an event pertaining to a vehicle and a user of the vehicle are presented. In some embodiments, a includes (a) detecting that a motion state of the vehicle is in a first state, (b) detecting a condition that warrants a change in the motion state of the vehicle to a second state, and (c) detecting the user of the vehicle's engagement in an activity that potentially impairs the user from performing an action to change the motion state of the vehicle to the second state. The method also includes, detecting the condition, and (c) detecting the user of the vehicle's engagement in the activity, executing an event to facilitate the change in the motion state of the vehicle to the second state.

20 Claims, 4 Drawing Sheets

(56) References Cited

U.S. PATENT DOCUMENTS

| | | | | |
|---|---|---|---|---|
| 2003/0125855 | A1* | 7/2003 | Breed | B60N 2/002 |
| | | | | 701/36 |
| 2005/0131607 | A1* | 6/2005 | Breed | B60R 21/0152 |
| | | | | 701/45 |
| 2008/0294315 | A1* | 11/2008 | Breed | E05F 15/431 |
| | | | | 701/49 |
| 2009/0010494 | A1* | 1/2009 | Bechtel | G01S 11/12 |
| | | | | 382/104 |
| 2014/0350836 | A1* | 11/2014 | Stettner | G01S 17/931 |
| | | | | 701/301 |
| 2016/0101784 | A1* | 4/2016 | Olson | B60K 35/00 |
| | | | | 340/576 |
| 2016/0200317 | A1* | 7/2016 | Danzl | B60K 28/06 |
| | | | | 701/25 |
| 2017/0038773 | A1* | 2/2017 | Gordon | G05D 1/0061 |
| 2017/0244160 | A1* | 8/2017 | Neubecker | H01Q 3/08 |
| 2017/0297569 | A1* | 10/2017 | Nilsson | B60W 40/04 |

\* cited by examiner

ACTIVATE/DEACTIVATE FUNCTIONALITY IN RESPONSE TO ENVIRONMENTAL CONDITIONS

CROSS-REFERENCE TO RELATED APPLICATIONS

This application claims the benefit of U.S. Provisional Application No. 62/356,458, filed Jun. 29, 2016, the entirety of which is hereby incorporated by reference.

BACKGROUND

Aspects of the disclosure relate to vehicular environmental conditions. Today, drivers face many distractions while operating a vehicle on the road. For example, with the advent of mobile devices, drivers are easily tempted to use such mobile devices while driving. Other examples of distractions include interacting with a vehicle infotainment system, radio, daydreaming, or any other distraction that takes away the driver's attention. As a result, distracted drivers may often slow down traffic by, for example, not accelerating the vehicle upon a traffic light changing to green, driving through an intersection after approaching a stop sign, etc. Embodiments of the invention address these problems, both individually and collectively.

BRIEF SUMMARY

In various embodiments, a method may be provided for executing an event pertaining to a vehicle and a user of the vehicle. The method may include (a) detecting that a motion state of the vehicle is in a first state, (b) detecting a condition that warrants a change in the motion state of the vehicle to a second state, and (c) detecting the user of the vehicle's engagement in an activity that potentially impairs the user from performing an action to change the motion state of the vehicle to the second state. The method may also include, in response to (a) detecting that the motion state of the vehicle is in the first state, (b) detecting the condition, and (c) detecting the user of the vehicle's engagement in the activity, executing an event to facilitate the change in the motion state of the vehicle to the second state.

In some embodiments, the event comprises presenting a notification to the user of the vehicle.

In some embodiments, the notification comprises at least one of an auditory notification, visual notification, or haptic notification.

In some embodiments, the event comprises facilitating entry of the vehicle into an autonomous driving mode.

In some embodiments, detecting the condition that warrants the change in the motion state of the vehicle to a second state comprises detecting a change in a status of a traffic light.

In some embodiments, detecting the condition that warrants the change in the motion state of the vehicle to a second state comprises detecting a change in a traffic condition.

In some embodiments, the first state comprises a stop state and the second state comprises a moving state.

In some embodiments, the method further comprises in response to (a) detecting that the motion state of the vehicle is in the first state, (b) detecting the condition, and (c) detecting the user of the vehicle's engagement in the activity, preventing interaction with a device within the vehicle.

In some embodiments, the device comprises at least one of a mobile device or infotainment system.

In some embodiments, detecting the condition may be based at least in part on one or more images obtained from a camera.

In some embodiments, detecting the condition may be based at least in part on one more signals obtained by a radar or Light Detection And Ranging (LIDAR) apparatus.

In some embodiments, detecting the condition may be based at least in part on a received wireless communication.

In some embodiments, an apparatus for executing an event pertaining to a vehicle and a user of the vehicle may include (a) means for detecting that a motion state of the vehicle is in a first state, (b) means for detecting a condition that warrants a change in the motion state of the vehicle to a second state, and (c) means for detecting the user of the vehicle's engagement in an activity that potentially impairs the user from performing an action to change the motion state of the vehicle to the second state. The apparatus may further include means, in response to (a) detecting that the motion state of the vehicle is in the first state, (b) detecting the condition, and (c) detecting the user of the vehicle's engagement in the activity, for executing an event to facilitate the change in the motion state of the vehicle to the second state.

In some embodiments, a system for executing an event pertaining to a vehicle and a user of the vehicle may include a processor and a computer readable medium coupled to the processor. The computer readable medium may comprise code, executable by the processor, for implementing a method. The method may include (a) detecting that a motion state of the vehicle is in a first state, (b) detecting a condition that warrants a change in the motion state of the vehicle to a second state, and (c) detecting the user of the vehicle's engagement in an activity that potentially impairs the user from performing an action to change the motion state of the vehicle to the second state. The method may also include, in response to (a) detecting that the motion state of the vehicle is in the first state, (b) detecting the condition, and (c) detecting the user of the vehicle's engagement in the activity, executing an event to facilitate the change in the motion state of the vehicle to the second state.

BRIEF DESCRIPTION OF THE DRAWINGS

Aspects of the disclosure are illustrated by way of example. In the accompanying figures, like reference numbers indicate similar elements.

DETAILED DESCRIPTION

Examples are described herein in the context of detecting vehicular environmental conditions. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Figure 1:
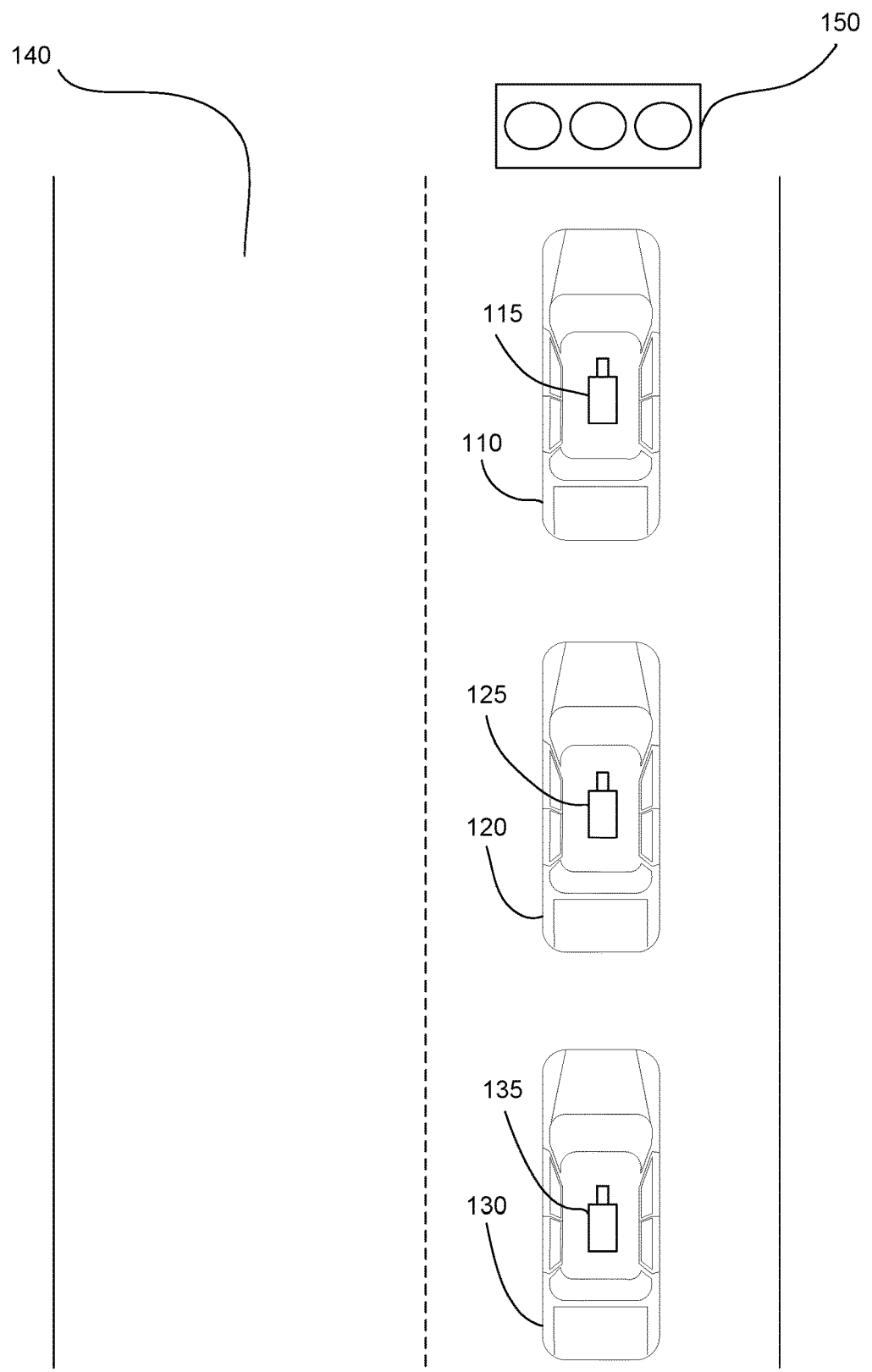
FIG. 1 illustrates a plurality of vehicles on a road regulated by a traffic light.

FIG. 1 illustrates a plurality of vehicles 110, 120, and 130 on a road 140 regulated by a traffic light 150. In this example, the vehicles 110, 120, and 130 are depicted as sedans, but can be any type of vehicle including, but not limited to, coupes, sports utility vehicles, station wagons, convertibles, vans, buses, heavy equipment, and motorcycles. The vehicles in this example include a first vehicle 110, second vehicle 120, and third vehicle 130. Each vehicle may also be equipped with at least one camera device. For example, the first vehicle 110 may be equipped with a first camera device 115, the second vehicle 120 may be equipped with a second camera device 125, and the third vehicle may be equipped with a third camera device 135. The camera devices 115, 125, and 135 may be camera devices that are built into the vehicles 110, 120, and 130, or may be external camera devices, such as dash cameras, side-facing cameras, mobile phone cameras, etc. The camera devices 115, 125, and 135 may be configured to capture one or more images of an environment surrounding the vehicles.

In this example, the first vehicle 110 may be the first car in a line waiting at an intersection due to a red light displayed by the traffic light 150. The driver of the first vehicle 110 may be distracted from noticing a change in the display of the traffic light 150 for various reasons. For example, the driver may be interacting with his/her mobile device in order to text a friend. Due to the driver's distraction, the driver may not notice that the traffic light 150 has changed from red to green, indicating that the vehicles 110, 120, and 130 have permission to move forward. As a result, it is possible that the driver of the first vehicle 110 may not accelerate forward through the intersection within a reasonable amount of time after the traffic light 150 changes its display to green. Accordingly, the drivers of the second vehicle 120 and third vehicle 130 may become impatient and irritated, having suffered the inconvenience caused by the driver of the first vehicle 110.

According to some embodiments, the first camera 115 may continuously capture images of the environment in front of the first vehicle 110. The captured images of the environment may include images of the traffic light 150 within the environment. Embodiments described herein may utilize such images to detect that the display of the traffic light 150 has changed and take action to help avert the type of negative experience described above.

For example, a system associated with the first vehicle 110 may be able to detect that the vehicle is in a stop state. The system may be able to determine this using, for example, accelerometer data, Global Positioning System (GPS) data, image recognition, LIDAR readings, and/or other types of data. Additionally, the system may detect a condition that warrants a change in the motion state from a stop state to a moving state. For example, based on the one or more images captured by the first camera 115, the system associated with the first vehicle 110 may be able to determine that the traffic light 150 display has changed from red to green. In some embodiments, the system may detect that a condition is about to occur that warrants a change in the motion state from a stop state to a moving state. For example, the system associated with the first vehicle 110 may be able to receive a signal from a traffic light indicating that it is about to (e.g., is 5 seconds away from) change from red to green. Alternatively or in addition, the first vehicle 110 can determine that other traffic lights (e.g., traffic lights controlling traffic on a perpendicular street) have changed from green to amber, indicating that the traffic light 150 display is about to change from red to green. Further, the system may also be able to determine whether the driver is engaged in activity that could potentially impair the driver from accelerating the vehicle at the appropriate time (e.g., when the traffic light 150 changes display from red to green). This may be accomplished by, for example, sensing that the user is engaged with the vehicle infotainment system or that the user is interacting with his/her mobile device (e.g., by a wireless communication link established between the mobile device and the vehicle). If the system detects that the vehicle is in the stop state, that the vehicle should transition to a moving state based on a satisfied condition, and that the driver is engaged in an event that could potentially impair the driver from putting the vehicle into the moving state, the system may take action.

One such action could include preventing the driver from engaging in the activity that potentially impairs his/her ability to perform the desired task, which in this case is progressing through the intersection. For example, if the system detects that the user is engaged with the infotainment system when the user should be performing an action to transition the vehicle from a stop state to a moving state, the system may prevent access to the infotainment system of the first vehicle 110 such that the user may no longer interact with the infotainment system. In another example, the system may prevent the driver from accessing his/her mobile device within the first vehicle 110. In some embodiments, only certain features of the infotainment system or mobile device may be disabled. For example, texting, e-mail, video, and navigation entry may be disabled on the infotainment system or mobile device while music and phone calling functions may remain enabled.

In another example, the system may notify the driver (e.g., via the infotainment system or the driver's mobile device within the first vehicle 110) that a change in the display of the traffic light 150 has been detected and that the user should accelerate the vehicle. The notification can be, for example, an auditory notification, visual notification, or other type of notification. For example, the notification may also be a haptic-based notification, such as vibrating the driver's car seat.

In some implementations, the system may perform similar functions at a "STOP" sign. Such operation may resemble the functions described above with respect to traffic light 150. For example, when a driver approaches a "STOP" sign and brings the vehicle to a stop (e.g., stop state), the system may determine that the driver has stopped the vehicle at the "STOP" sign based on one or more images captured by the first camera 115, LIDAR, and/or radar. If the system determines that a condition has occurred that warrants the vehicle changing to a moving state and that the driver is engaged in an activity that potentially impairs the driver from placing the vehicle in the motion state, the system may take action. For example, if a vehicle in front of the first vehicle is determined to have moved forward past a threshold distance from the first vehicle 115 (e.g., by using a RGB-depth camera, LIDAR, and/or radar), the system may determine that the condition has occurred. Similarly, if the first vehicle 115 is closest to the "STOP" sign with no vehicles in front of it, the system may determine that the condition has occurred if the vehicle does not accelerate within 5 seconds. Upon determination the condition has occurred, and upon determination that the user is engaged in an activity potentially impairing the driver from accelerating the vehicle (e.g., interfacing with the mobile device or infotainment system), the system may perform one of the actions described above such as notifying the driver to move forward or providing some other sort of feedback to the driver.

In some implementations, the system described above can also be implemented in a similar fashion with respect to toll booths, various types of metering lights, and/or other road or traffic features.

In some implementations, and as briefly discussed above, the vehicles may be equipped with wireless receivers capable of communication with traffic lights 150 having wireless transmitters. These traffic lights 150 having wireless transmitters may be referred to as "smart traffic lights." A smart traffic light may transmit a broadcast message to nearby vehicles which may be able to pick up the transmitted broadcast messages. The broadcast messages may notify the vehicles within the vicinity of the smart traffic light that a display of the traffic light will change within a certain amount of time. For example, a smart traffic light may broadcast a message indicating that its display may be changing from red to green within the next 5 seconds. Accordingly, the system may preemptively provide a notification to the user that the status of the traffic light is about to change. Additionally, the system may prevent certain interactions with the devices in the vehicle in a fashion similar to that described above. For example, the system may preemptively provide a notification to the user that the status of the traffic lights controlling traffic on a perpendicular street is about to change. As another example, the system may preemptively provide a notification to the user that the status of a traffic light associated with a turning lane is about to change. As yet another example, the system may preemptively provide a notification to the user that the status of a light associated with pedestrians walking is about to change (e.g., the system may determine an amount of time displayed on a "WALK" signal indicating how long until a blinking hand will become a solid hand). Further, as another example, the system may preemptively provide a notification to the user that the status associated with a traffic light is about to change based on perceived movement of pedestrians, other vehicles, and/or cyclists (e.g., using video, LIDAR, and/or radar). As another example, the system may preemptively provide a notification to a user that an automotive platoon that a vehicle is associated with is about to change states. For example, vehicles in a platoon may exchange information wirelessly. It should be appreciated that one or more of these example conditions/implementations described above and/or below may be combined to create a system that more accurately determines when to provide a notification. Moreover, additional conditions/implementations may be determined/derived from information received from a network (e.g., a deep neural network, a recurrent neural network, a deep belief network, and/or a convolutional neural network).

In some implementations, the system's functionality may be carried out in response to detecting a police car or other emergency vehicle nearby. For example, based on a received wireless communication (e.g., crowd-sourced location of emergency vehicle) or based on auditory or visual detection of the emergency vehicle (e.g., using a microphone or camera equipped within the vehicle), the system may notify the user via the infotainment system or the driver's mobile device that an emergency vehicle is within the vicinity.

In some implementations, the alert notifications (either for moving the vehicle forward or reporting the presence of an emergency vehicle) can also be sent to the passengers of the vehicle. For example, the notifications can be sent to the individual mobile devices belonging to each passenger of the vehicle, or the notifications can be sent via haptic feedback (e.g., vibrating the seat) to each passenger within the vehicle. The locations of the passengers in the vehicle may be determined by one or more sensors within the vehicle. For example, seat occupancy sensors may be used to determine the presence of one or more passengers within the vehicle.

In some implementations, the system may consider additional environmental conditions prior to providing the driver of the vehicle with the notification to accelerate the vehicle forward. For example, the system, via the first camera 115, can determine whether a pedestrian, bicyclist, or other obstruction is in the path in front of the first vehicle 110. This determination may be based on one or more images captured by the first camera 115, LIDAR, and/or radar. If an obstruction is determined to be in the direct forward path of the first vehicle 115, and the other conditions for notifying the driver to accelerate forward have been met, the system may provide a notification to the user indicating that the traffic light 150 has turned green, but the user should wait until the obstruction has cleared. Additionally, the system may prevent any accelerator input from the driver from propelling the vehicle forward. This implementation may prevent an accidental collision with a pedestrian or other obstruction because of the user's quick reaction to a potential notification to move forward or to a honking horn from an upset driver in a vehicle behind the driver's vehicle.

In some implementations, a signal or other notification may be displayed or presented to vehicles behind the first vehicle 110 in response to the system determining there is a pedestrian or other obstacle in front of the first vehicle 110, at a time when the vehicle should otherwise be accelerating forward. For example, a signal may be presented using the tail lights of the first vehicle 110. The tail lights may display a certain pattern indicating that there is a pedestrian or other obstacle in front of the first vehicle 110. In another example, a wireless vehicle-to-vehicle (V2V) communication may be transmitted from the first vehicle 110 to vehicles behind the first behind 110, indicating that there is a pedestrian or other obstacle in front of the first vehicle 110. In some implementations, the driver may also manually invoke the display of the signal or transmission of the notification.

In some implementations, the "lockout" feature of the system may not engage to prevent the driver from using the vehicle infotainment system or the driver's mobile device, if the system detects that even though the vehicle should be accelerating forward, another environmental condition prevents the vehicle from being able to do so (e.g., pedestrian or obstruction blocking the path, or a traffic jam). This may prevent the driver from reflexively propelling the vehicle into the middle of an intersection, for example, when an obstruction is actually present.

Figure 2:
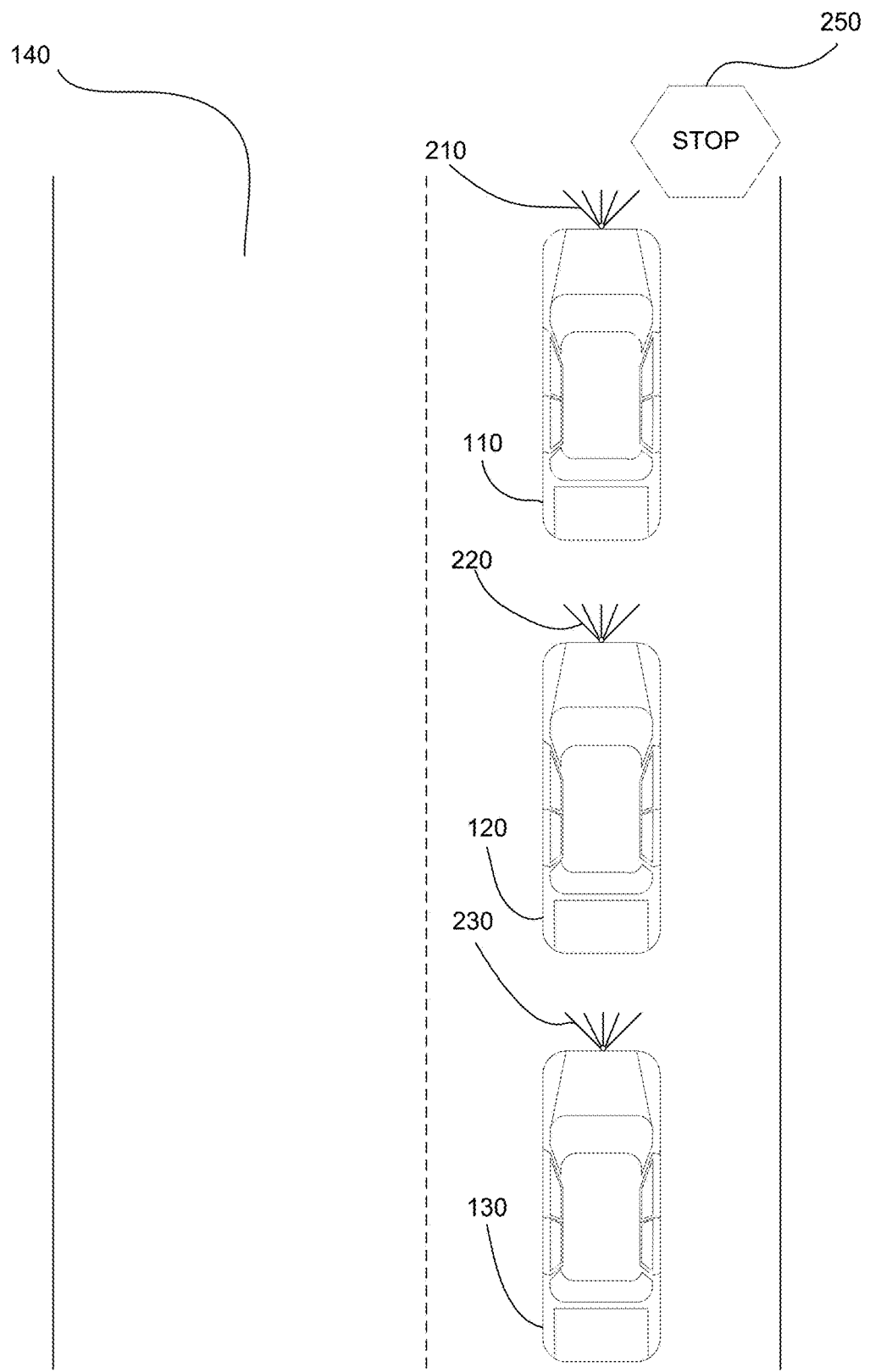
FIG. 2 illustrates a plurality of vehicles on a road regulated by a "STOP" sign.

FIG. 2 illustrates a plurality of vehicles 110, 120, 130 on a road 140 regulated by a "STOP" sign 250. Again, the vehicles in this example include a first vehicle 110, second vehicle 120, and third vehicle 130. Each vehicle may also be equipped with a ranging device. For example, the first vehicle 110 may be equipped with a first ranging device 210, the second vehicle 120 may be equipped with a second ranging device 220, and the third vehicle may be equipped with a third ranging device 230. The ranging devices 210, 220, and 230 may be ranging devices that are built into the vehicles 110, 120, 130. The ranging devices can include radar or LIDAR ranging devices. The ranging devices 210, 220, and 230 may be configured to determine the presence of or distance to an object in front of the vehicles 110, 230, 130.

In this example, the second vehicle 120 may be the second car in a line waiting at an intersection due to a "STOP" sign 150. For example, the second vehicle 120 may be waiting behind the first vehicle 110. The driver of the second vehicle 120 may be distracted from paying attention to see when the first vehicle 110 has moved the past the "STOP" sign 250 and when the driver of the second vehicle 120 can move the second vehicle 120 forward. For example, the driver of the second vehicle 120 may be interacting with his/her mobile device in order to text a friend. Due to the driver's distraction, the driver may not notice that the first vehicle 110 has moved forward.

However, according to some embodiments, the second ranging device 220 of the second vehicle 120 may continuously transmit ranging signals such that the ranging signals can be used to determine the distance of the first vehicle 110 from the second vehicle 120. If the processed ranging signals indicate that the first vehicle 110 has moved forward, the driver of the second vehicle 120 may be notified to move the second vehicle forward 120 according to the implementations described above with respect to FIG. 1. Alternatively or additionally, the second vehicle 120 may be placed in an autonomous driving mode similar to the implementations described above with respect to FIG. 1.

Figure 3:
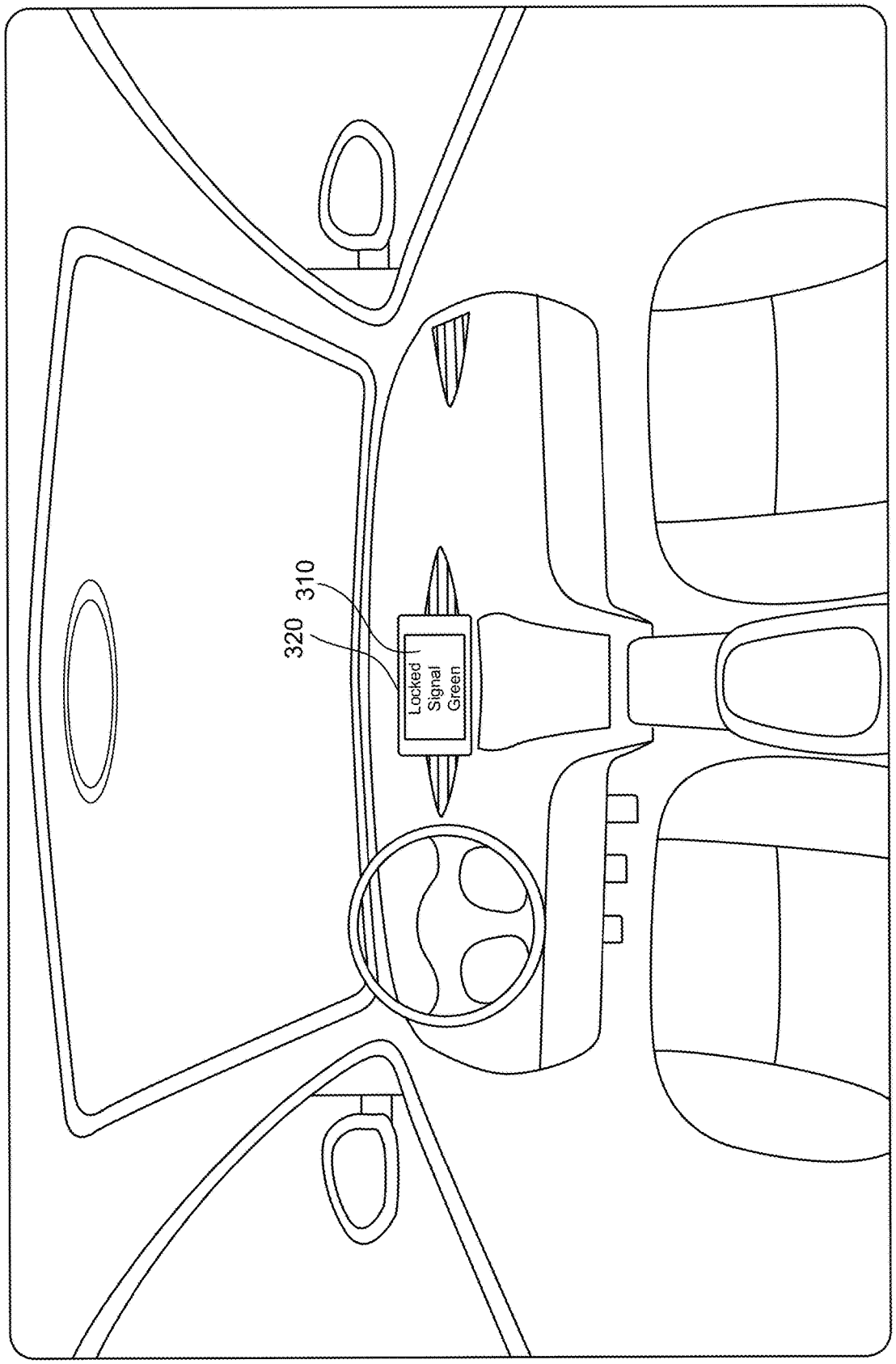
FIG. 3 illustrates a notification provided to a user on an in-car infotainment system.

FIG. 3 illustrates an example notification 310 provided to a user on an in-car infotainment system 320. The notification may be generated according to the implementations described above with respect to FIG. 1. For example, once the system detects that (1) the vehicle is in the stop state, (2) the vehicle should transition to a moving state based on a satisfied condition, and (3) the driver is engaged in an event that could potentially impair the driver from putting the vehicle into the moving state, the system may generate the notification 310 on the infotainment system 320. While the current examples illustrate that the notification 310 is displayed on the infotainment system 320, the notification can also be displayed on the user's mobile device. For example, the system may transmit the notification to the mobile device using a wireless communication link such, as but not limited, to Bluetooth or Wi-Fi.

Figure 4:
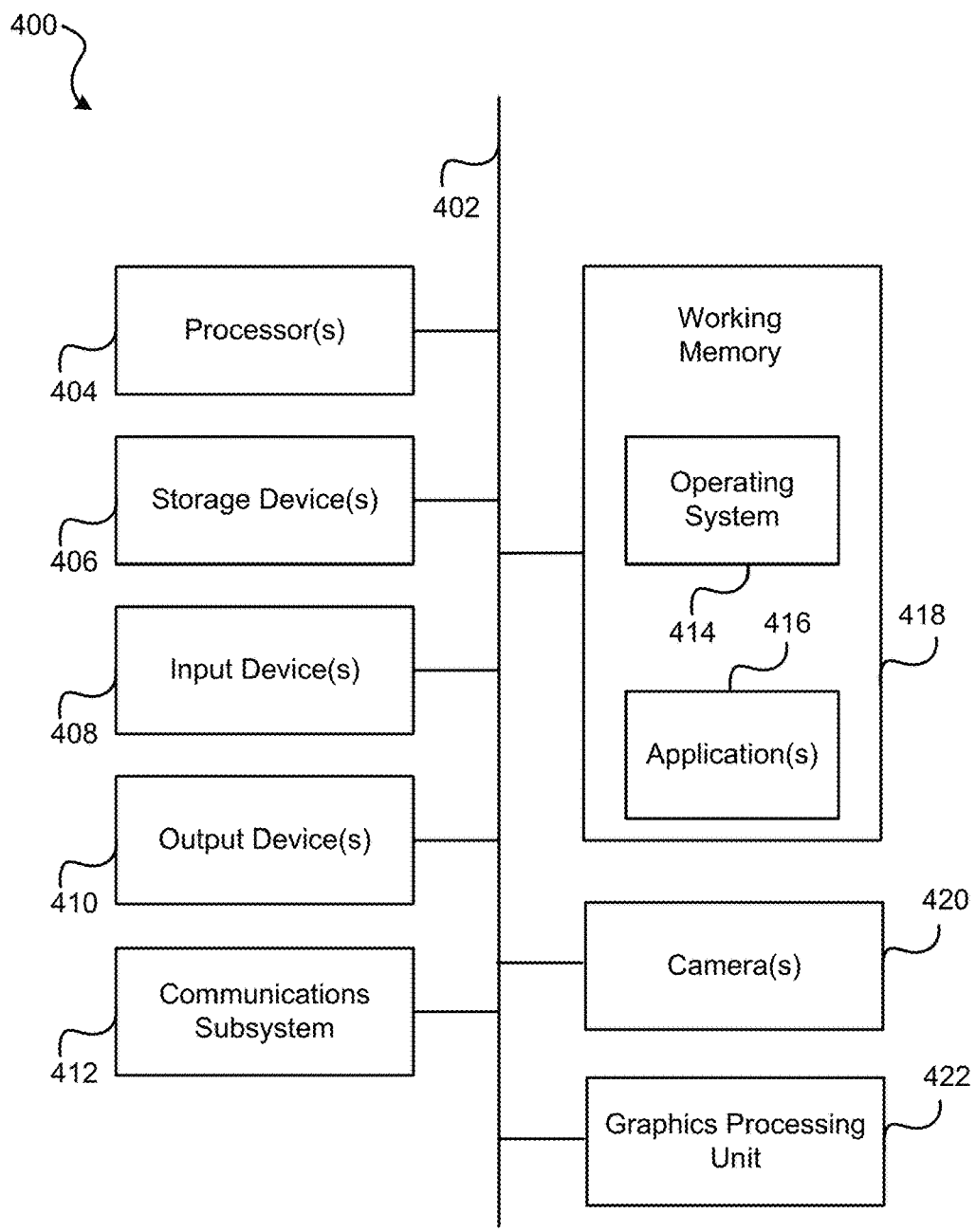
FIG. 4 illustrates an example of a computing system in which one or more embodiments may be implemented.

FIG. 4 illustrates an example of a computing system in which one or more implementations may be implemented.

A computer system as illustrated in FIG. 4 may be incorporated as part of the above described power control system. For example, computer system 400 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 4 provides a schematic illustration of one implementation of a computer system 400 that can perform the methods provided by various other implementations, as described herein, and/or can function as the host computer system, a remote kiosk/terminal, a point-of-sale device, a telephonic or navigation or multimedia interface in an automobile, a computing device, a set-top box, a table computer and/or a computer system. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 402 (or may otherwise be in communication, as appropriate). The hardware elements may include one or more processors 404, including without limitation one or more general-purpose processors and/or one or more special-purpose processors (such as digital signal processing chips, graphics processing units 422, and/or the like); one or more input devices 408, which can include without limitation one or more cameras, sensors, a mouse, a keyboard, a microphone configured to detect ultrasound or other sounds, and/or the like; and one or more output devices 410, which can include without limitation a display unit such as the device used in implementations of the invention, a printer and/or the like. Additional cameras 420 may be employed for detection of user's extremities and gestures. In some implementations, input devices 408 may include one or more sensors such as infrared, depth, LIDAR, radar, and/or ultrasound sensors. The graphics processing unit 422 may be used to carry out the method for real-time wiping and replacement of objects described above.

In some implementations of the implementations of the invention, various input devices 408 and output devices 410 may be embedded into interfaces such as display devices, tables, floors, walls, and window screens. Furthermore, input devices 408 and output devices 410 coupled to the processors may form multi-dimensional tracking systems.

The computer system 400 may further include (and/or be in communication with) one or more non-transitory storage devices 406, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 400 might also include a communications subsystem 412, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 412 may permit data to be exchanged with a network, other computer systems, and/or any other devices described herein. In many implementations, the computer system 400 will further comprise a non-transitory working memory 418, which can include a RAM or ROM device, as described above.

The computer system 400 also can comprise software elements, shown as being currently located within the working memory 418, including an operating system 414, device drivers, executable libraries, and/or other code, such as one or more application programs 416, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 406 described above. In some cases, the storage medium might be incorporated within a computer system, such as computer system 400. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 400 may be omitted or may be implemented separate from the illustrated system. For example, the processor 404 and/or other elements may be implemented separate from the input device 408. In one implementation, the processor may be configured to receive images from one or more cameras that are separately implemented. In some implementations, elements in addition to those illustrated in FIG. 4 may be included in the computer system 400.

Some implementations may employ a computer system (such as the computer system 400) to perform methods in accordance with the disclosure. For example, some or all of the procedures of the described methods may be performed by the computer system 400 in response to processor 404 executing one or more sequences of one or more instructions (which might be incorporated into the operating system 414 and/or other code, such as an application program 416) contained in the working memory 418. Such instructions may be read into the working memory 418 from another computer-readable medium, such as one or more of the storage device(s) 406. Merely by way of example, execution of the sequences of instructions contained in the working memory 418 might cause the processor(s) 404 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 400, various computer-readable media might be involved in providing instructions/code to processor(s) 404 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 406. Volatile media include, without limitation, dynamic memory, such as the working memory 418. Transmission media include, without limitation, coaxial cables, copper wire and fiber optics, including the wires that comprise the bus 402, as well as the various components of the communications subsystem 412 (and/or the media by which the communications subsystem 412 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 404 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various implementations of the invention.

The communications subsystem 412 (and/or components thereof) generally will receive the signals, and the bus 402 then might carry the signals (and/or the data, instructions, etc. carried by the signals) to the working memory 418, from which the processor(s) 404 retrieves and executes the instructions. The instructions received by the working memory 418 may optionally be stored on a non-transitory storage device 406 either before or after execution by the processor(s) 404.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for executing an event pertaining to a vehicle and a user of the vehicle, comprising: the vehicle
   (a) detecting that a motion state of the vehicle is in a first state;
   (b) detecting a condition that warrants a change in the motion state of the vehicle to a second state, the condition comprising an expected change in a status of a traffic light;
   (c) detecting an engagement of the user of the vehicle in an activity that impairs the user from performing an action to change the motion state of the vehicle to the second state;
   in response to (a) detecting that the motion state of the vehicle is in the first state, (b) detecting the condition, and (c) detecting the user of the vehicle's engagement in the activity, executing an event to facilitate the change in the motion state of the vehicle to the second state;
   (d) detecting an obstacle in front of the vehicle; and
   in response to (d), preventing an accelerator input from the user and communicating by having taillights displaying a pattern to another vehicle behind the vehicle, the pattern indicating the detection of the obstacle.

2. The method of claim 1, wherein the event comprises at least one of:
   presenting a notification to the user of the vehicle; or
   facilitating entry of the vehicle into an autonomous driving mode.

3. The method of claim 2, wherein the notification comprises at least one of an auditory notification, visual notification, or haptic notification.

4. The method of claim 1, wherein detecting the condition that warrants the change in the motion state of the vehicle to a second state further comprises at least one of:
   detecting a change in a status of a traffic light; or
   detecting a change in a traffic condition.

5. The method of claim 1, wherein the first state comprises a stop state and the second state comprises a moving state.

6. The method of claim 1, further comprising, in response to (a) detecting that the motion state of the vehicle is in the first state, (b) detecting the condition, and (c) detecting the user of the vehicle's engagement in the activity, preventing interaction with a device within the vehicle.

7. The method of claim 6, wherein the device comprises at least one of a mobile device or infotainment system.

8. The method of claim 1, wherein (b) detecting the condition is based at least in part on at least one of:
   one or more images obtained from a camera; or
   one more signals obtained by a radar or Light Detection And Ranging (LIDAR) apparatus.

9. The method of claim 1, wherein (b) detecting the condition is based at least in part on at least one of: a received wireless communication; or a recorded audio signal.

10. An apparatus for executing an event pertaining to a vehicle and a user of the vehicle, comprising:
    (a) means for detecting that a motion state of the vehicle is in a first state;
    (b) means for detecting a condition that warrants a change in the motion state of the vehicle to a second state, the condition comprising an expected change in a status of a traffic light;
    (c) means for detecting an engagement of the user of the vehicle in an activity that impairs the user from performing an action to change the motion state of the vehicle to the second state;
    means, in response to (a) detecting that the motion state of the vehicle is in the first state, (b) detecting the condition, and (c) detecting the user of the vehicle's engagement in the activity, for executing an event to facilitate the change in the motion state of the vehicle to the second state;
    (d) means for detecting an obstacle in front of the vehicle; and means, in response to (d), for preventing an accelerator input from the user and communicating by having taillights displaying a pattern to another vehicle behind the vehicle, the pattern indicating the detection of the obstacle.

11. The apparatus of claim 10, further comprising means for in response to (a) detecting that the motion state of the vehicle is in the first state, (b) detecting the condition, and (c) detecting the user of the vehicle's engagement in the activity, preventing interaction with a device within the vehicle.

12. A system for executing an event pertaining to a vehicle and a user of the vehicle, comprising:
  a processor; and
  a non-transitory computer readable medium coupled to the processor, the computer readable medium comprising code, executable by the processor, for implementing a method comprising:
    (a) detecting that a motion state of the vehicle is in a first state;
    (b) detecting a condition that warrants a change in the motion state of the vehicle to a second state, the condition comprising an expected change in a status of a traffic light;
    (c) detecting an engagement of the user of the vehicle in an activity that impairs the user from performing an action to change the motion state of the vehicle to the second state;
  in response to (a) detecting that the motion state of the vehicle is in the first state, (b) detecting the condition, and (c) detecting the user of the vehicle's engagement in the activity, executing an event to facilitate the change in the motion state of the vehicle to the second state;
    (d) detecting an obstacle in front of the vehicle; and
  in response to (d), preventing an accelerator input from the user and communicating by having taillights displaying a pattern to another vehicle behind the vehicle, the pattern indicating the detection of the obstacle.

13. The system of claim 12, wherein the event comprises at least one of:
  presenting a notification to the user of the vehicle; or
  facilitating entry of the vehicle into an autonomous driving mode.

14. The system of claim 13, wherein the notification comprises at least one of an auditory notification, visual notification, or haptic notification.

15. The system of claim 12, wherein detecting the condition that warrants the change in the motion state of the vehicle to a second state further comprises at least one of:
  detecting a change in a status of a traffic light; or
  detecting a change in a traffic condition.

16. The system of claim 12, wherein the first state comprises a stop state and the second state comprises a moving state.

17. The system of claim 12, wherein the method further comprises, in response to (a) detecting that the motion state of the vehicle is in the first state, (b) detecting the condition, and (c) detecting the user of the vehicle's engagement in the activity, preventing interaction with a device within the vehicle.

18. The system of claim 17, wherein the device comprises at least one of a mobile device or infotainment system.

19. The system of claim 12, wherein (b) detecting the condition is based at least in part on at least one of: one or more images obtained from a camera; or one more signals obtained by a radar or Light Detection And Ranging (LIDAR) apparatus.

20. The system of claim 12, wherein (b) detecting the condition is based at least in part on at least one of:
  a received wireless communication; or
  a recorded audio signal.

* * * * *